(12) United States Patent
Seo et al.

(10) Patent No.: US 7,680,395 B2
(45) Date of Patent: Mar. 16, 2010

(54) APPARATUS AND METHOD FOR WRITING AND PLAYING BACK DIGITAL BROADCASTING SUPPLEMENTARY SERVICE INFORMATION AND RECORDING MEDIA THEREFOR

(75) Inventors: Kang Soo Seo, Kyunggi-do (KR); Jea Yong Yoo, Seoul (KR); Byung Jin Kim, Kyunggi-do (KR); Hyung Sun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/503,101

(22) Filed: Jul. 15, 2009

(65) Prior Publication Data

US 2009/0269035 A1    Oct. 29, 2009

Related U.S. Application Data

(63) Continuation of application No. 11/559,641, filed on Nov. 14, 2006, which is a continuation of application No. 09/888,761, filed on Jun. 25, 2001, now Pat. No. 7,139,467.

(30) Foreign Application Priority Data

Jun. 24, 2000    (KR) .................... 10-2000-0035157

(51) Int. Cl.
*H04N 7/00*    (2006.01)
*H04N 7/26*    (2006.01)
(52) U.S. Cl. .......................................... 386/95; 386/124
(58) Field of Classification Search .................... 386/95, 386/124, 125, 46, 52, 109
See application file for complete search history.

(56) References Cited

U.S. PATENT DOCUMENTS

| 6,590,865 | B1 | 7/2003 | Ibaraki |
| 7,404,200 | B1 | 7/2008 | Hailey |
| 7,536,706 | B1 | 5/2009 | Sezan |

(Continued)

FOREIGN PATENT DOCUMENTS

JP    08-289248    11/1996

(Continued)

OTHER PUBLICATIONS

Monthly Magazine, pp. 166-167 of "Internet@ASCII" published on May 1997, 4 pages.

(Continued)

*Primary Examiner*—Robert Chevalier
(74) *Attorney, Agent, or Firm*—Fish & Richardson P.C.

(57) ABSTRACT

The present invention relates to method and apparatus of providing supplementary service information for A/V contents written in a recording medium. This method has a recording medium containing Presentation Language data, which have to be included like as in a digital television signal for supplementary service information in accordance with Advanced TV Enhancement Forum or Digital TV Application Software Environment standard, and reproduces, if a disk reproduction is requested, the Presentation Language data as well as requested A/V data and provides them for a connected external device such as a digital television. As a result, various video information and functions provided with Presentation Language data by a recording medium can be realized at a digital television set being able to accept Presentation Language data.

10 Claims, 5 Drawing Sheets

U.S. PATENT DOCUMENTS

| | | |
|---|---|---|
| 2003/0103765 A1 | 6/2003 | Sugahara |
| 2003/0147629 A1* | 8/2003 | Kikuchi et al. ............... 386/69 |
| 2003/0152366 A1 | 8/2003 | Kanazawa |
| 2005/0002651 A1* | 1/2005 | Ando et al. .................. 386/95 |

FOREIGN PATENT DOCUMENTS

| | | |
|---|---|---|
| JP | 11-088861 | 3/1999 |
| JP | 11-161663 | 6/1999 |
| JP | 11-239305 | 8/1999 |
| JP | 2000-149425 | 5/2000 |
| JP | 2001-292425 | 10/2001 |
| JP | 11-041312 | 6/2002 |
| JP | 2003-169295 | 6/2003 |
| WO | WO99/40720 | 8/1999 |

OTHER PUBLICATIONS

Office Action dated for May 13, 2008, for JP 2004-254323, 4 pages.

Office Action dated Mar. 17, 2009 for Application No. JP 2004-254323, 3 pages.

Office Action dated Jan. 20, 2006 for Application No. 09/888,761, 11 pages.

Multimedia Network Technology 16, (non-English), p. 91-102, May 1999.

* cited by examiner

Conventional Art

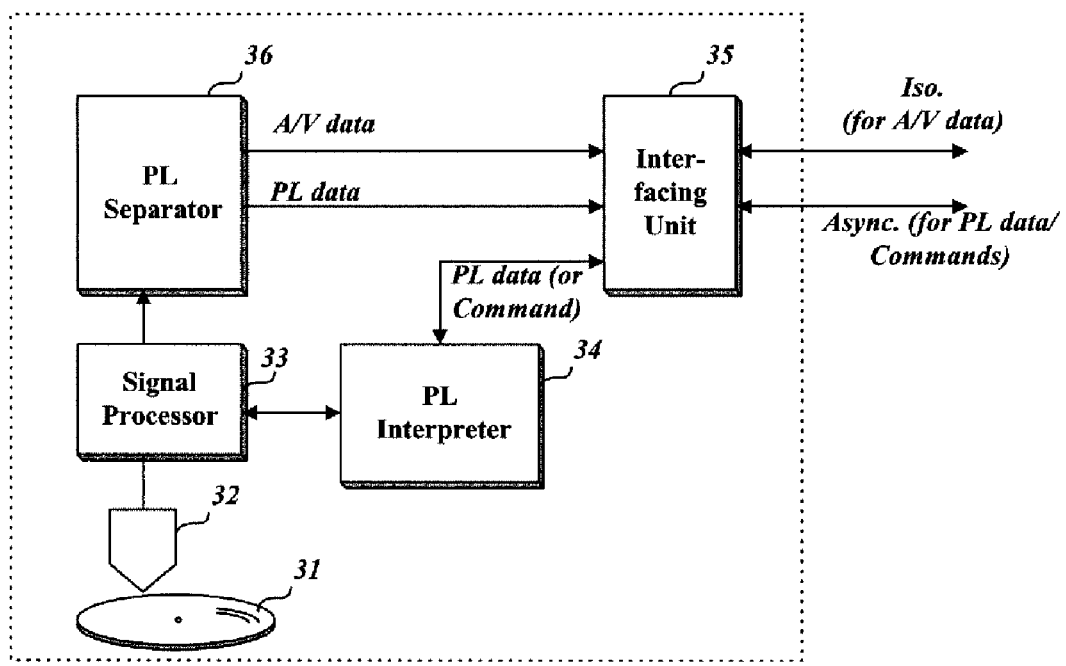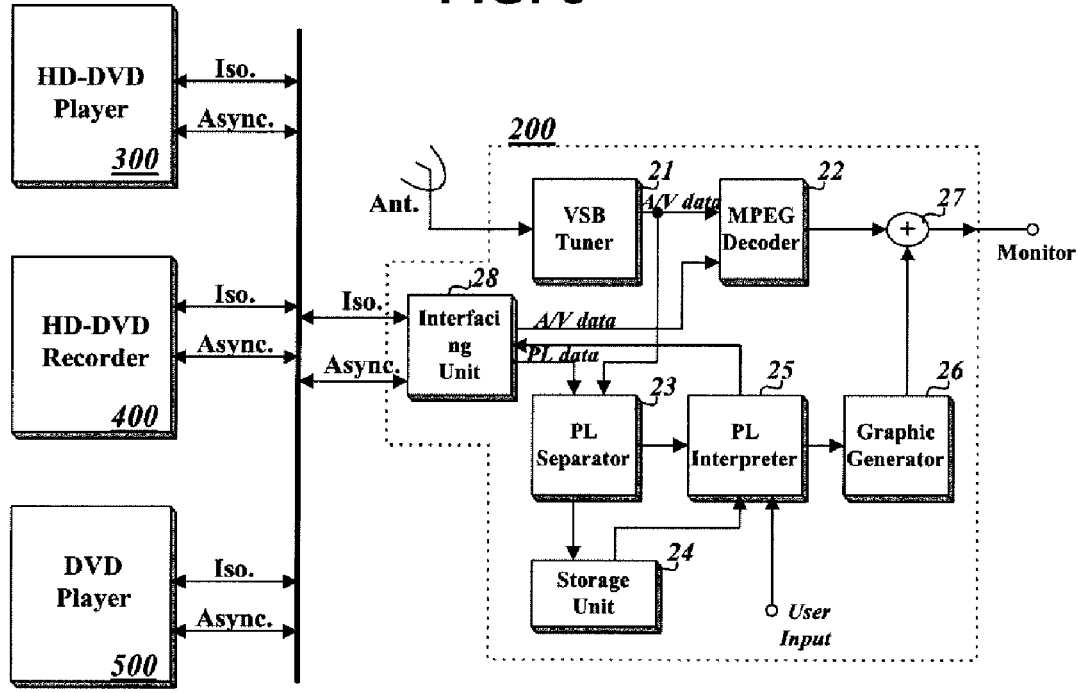

APPARATUS AND METHOD FOR WRITING AND PLAYING BACK DIGITAL BROADCASTING SUPPLEMENTARY SERVICE INFORMATION AND RECORDING MEDIA THEREFOR

CROSS-REFERENCE TO RELATED APPLICATIONS

This application is a continuation of U.S. patent application Ser. No. 11/559,641, filed Nov. 14, 2006, which is a continuation of U.S. patent application Ser. No. 09/888,761, filed Jun. 25, 2001, now U.S. Pat. No. 7,139,467, which claims the benefit of a foreign priority application filed in South Korea as App. No. 10-2000-0035157 on Jun. 24, 2000. The disclosures of these applications are incorporated by reference herein in their entirety.

BACKGROUND OF THE INVENTION

1. Field of the Invention

The present invention relates to method and apparatus for having an optical recording medium containing Presentation Language (called 'PL' hereinafter) data, which have to be included in a digital television signal for supplementary service information in accordance with Advanced TV Enhancement Forum (called 'ATVEF' hereinafter) or Digital TV Application Software Environment (called 'DASE' hereinafter) standard, and providing the PL data contained in a recording medium for a connected external apparatus.

2. Description of the Related Art

In these days, several standards for providing various supplementary services through digital television broadcast signal are under discussion. These standards are in regard to applying Internet Protocol Language such as HTML, Java Script, CSS, and DOM to digital television broadcast signal composed of A/V (Audio/Video) signals. ATVEF standard, which is under discussion with Microsoft company as a leader, is one of them. Another developing standard is DASE which is under discussion in ATSC sub-committee.

Therefore, a digital television set is likely to satisfy ATVEF or DASE standard, which means that it can receive and process PL data included in digital television broadcast signal to provide a viewer with various additional functions.

A digital television set being able to receive PL data of ATVEF or DASE standard will be configured as FIG. 1. The digital television set 100 of FIG. 1 comprises a VSB tuner 1 tuning VSB (Vestigial Sideband)-modulated digital television broadcast signal received through an antenna, and extracting MPEG transport stream belonging to a channel chosen by a viewer from the tuned signal; an MPEG decoder 2 decoding A/V data stream contained in the extracted transport stream to original picture and sound data; and a PL separator 3 extracting PL data contained in the extracted transport stream; and a storage unit 4 such as a hard disk or memory banks for storing the extracted PL data; a PL interpreter 5 interpreting PL data stored in the storage unit 4 or received from the PL separator 3; a graphic generator 6 generating a graphic image in accordance with the PL data interpretation; and a mixer 7 mixing synchronously picture data from the MPEG decoder 2 with the generated graphic image from the graphic generator 6 to be presented together onto a screen.

The digital television set 100 configured as above tunes a digital television broadcast signal received through an antenna, decodes transport stream of a chosen channel among the tuned signal, and presents the decoded data by moving pictures and sounds. At the same time, the digital television set 100 separates PL data from the transport stream, interprets the PL data, generates a graphic image in accordance with the interpretation of PL data, and overlays the graphic image onto the displayed picture as shown in FIG. 2.

As aforementioned, PL data will have a format like Internet language such as HTML, Java Script, CSS, and DOM, and are provided for various supplementary services from a broadcast station. The PL data from a broadcast station are likely to have a syntax of 'http://[site name] [attribute]', for example "http://lge.com/hdvdp.html". In ATVEF standard, unidirectional HTTP is probably applied to PL data. All or partial PL data are to be stored in the storage unit 4 for cross-referencing between HTML contents of A/V data. The PL data for cross-referencing may have a syntax of 'lid://[namespace-id][resource-path]', for example "lid://lge.com/hdvdp.html" or Owing to the PL data having such a syntax, a viewer is able to view a variety of supplementary service information for broadcasted television programs of a chosen channel through graphic images created based on the received PL data while viewing the broadcasted programs.

In addition, a high-density recording medium such as a DVD or a high-density DVD being able to store high-quality video data has been developed. Therefore, a disk apparatus for recording/reproducing television broadcast signal including PL data to/from such a high-density recording medium is under development among related companies.

However, it has not been specified how a high-density disk recording/reproducing apparatus stores PL data provided pursuant to ATVEF or DASE standard to a high-density recording medium, provides the stored PL data for a data presentation apparatus such as a digital television set, and supports PL data jointly with a digital television set. Therefore, such pending matters should be definitely settled as soon as possible.

SUMMARY OF THE INVENTION

It is an object of the present invention to provide method and apparatus of providing supplementary service information of A/V contents through a recording medium, which has a recording medium containing PL data as supplementary service information, which is included in digital broadcast signal according to ATVEF or DASE standard, besides real A/V data to be presented, and reads PL data only or along with real A/V data to send them to a connected digital television set as well as interprets PL data and conducts necessary operations the interpretation is indicative of.

It is another object of the present invention to provide a recording medium storing PL data as supplementary service information, which is in accordance with ATVEF or DASE standard, besides written A/V contents.

The present invention is characterized in that a recording medium includes A/V data; navigation data for control of searching and reproducing the A/V data; and language-formatted data an A/V presenting apparatus can interpret.

The present invention is also characterized in that a method of providing supplementary service information for A/V contents from a recording medium, comprising the steps of reproducing A/V data and language-formatted data, which a digital television set can interpret, from a recording medium, and transmitting the reproduced A/V data and language-formatted data to a connected external apparatus through a digital interface.

The present invention is also characterized in that an apparatus of reproducing a recording medium containing supplementary service information for written A/V contents, comprising a data pickup reading data written in the recording medium, a data separator separating the read data consisting of transport packets into A/V data and language-formatted data, which a digital television set can interpret, based on packet identifier of each transport packet, and a data transmitter transmitting the separated A/V data and language-formatted data to a connected external apparatus through a digital interface.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 4 is another block diagram of a high-density DVD player which further includes a PL separator as internal elements;

FIG. 5 shows a digital television set connected with a plurality of disk devices.

DETAILED DESCRIPTION OF THE PREFERRED EMBODIMENT

In order that the invention may be fully understood, a preferred embodiment thereof will now be described with reference to the accompanying drawings.

Figure 3:
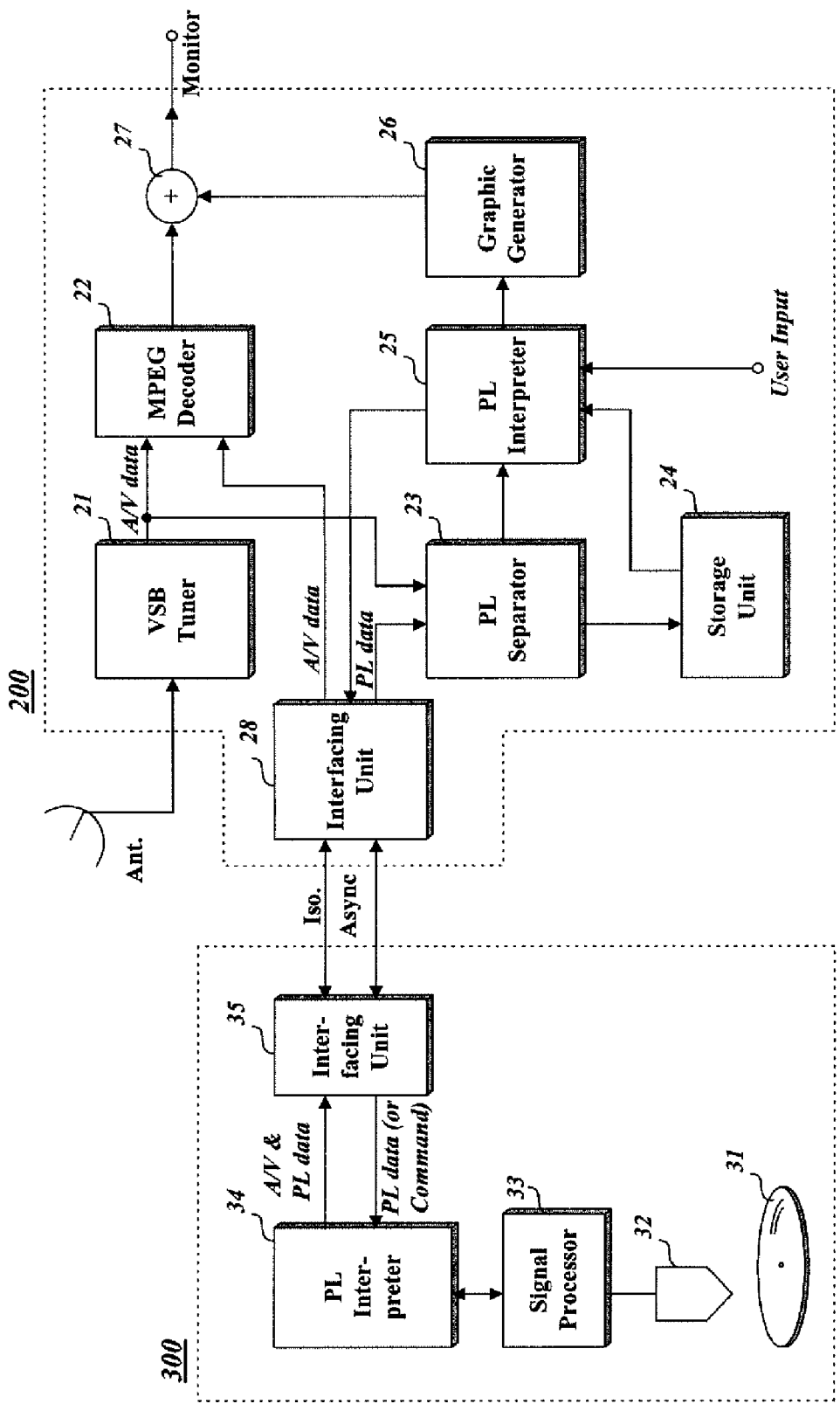
FIG. 3 is a block diagram of a mutually connected optical disk device and a digital television set which are configured in accordance with the present invention.

FIG. 3 shows a block diagram of a mutually connected optical disk device and a digital television set which are configured in accordance with the present invention.

The disk device 300 of FIG. 3 may be a HD (High-Density) DVD player comprising an optical pickup 32 reading signals written in a HD-DVD 31; a signal processor 33 binarizing RF signals read from the HD-DVD 31 and restoring the binarized signal into original digital data; a PL interpreter 34 conducting reproduction of A/V data and PL data written in the HD-DVD 31 according to PL data or commands received from a connected digital television set; and an interfacing unit 35 transmitting the reproduced A/V and PL data to the connected digital television set through IEEE 1394 interface.

Figure 1:
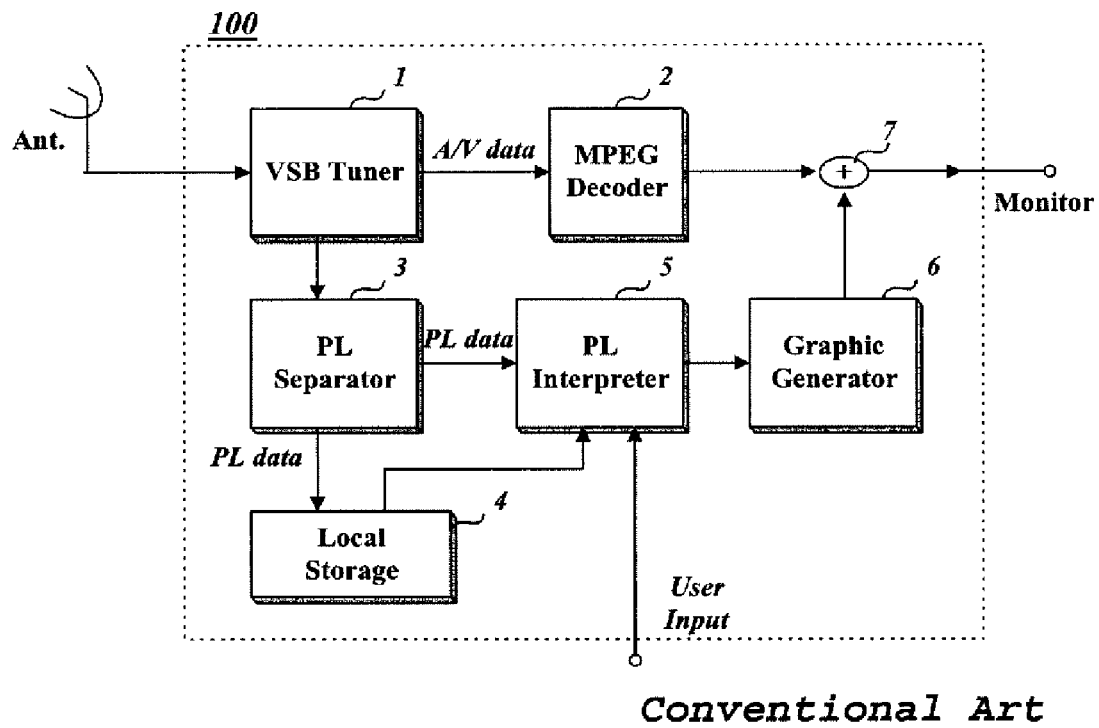
FIG. 1 is a block diagram of a digital television set being able to accept PL data provided additionally according to ATVEF or DASE standard.
Figure 2:
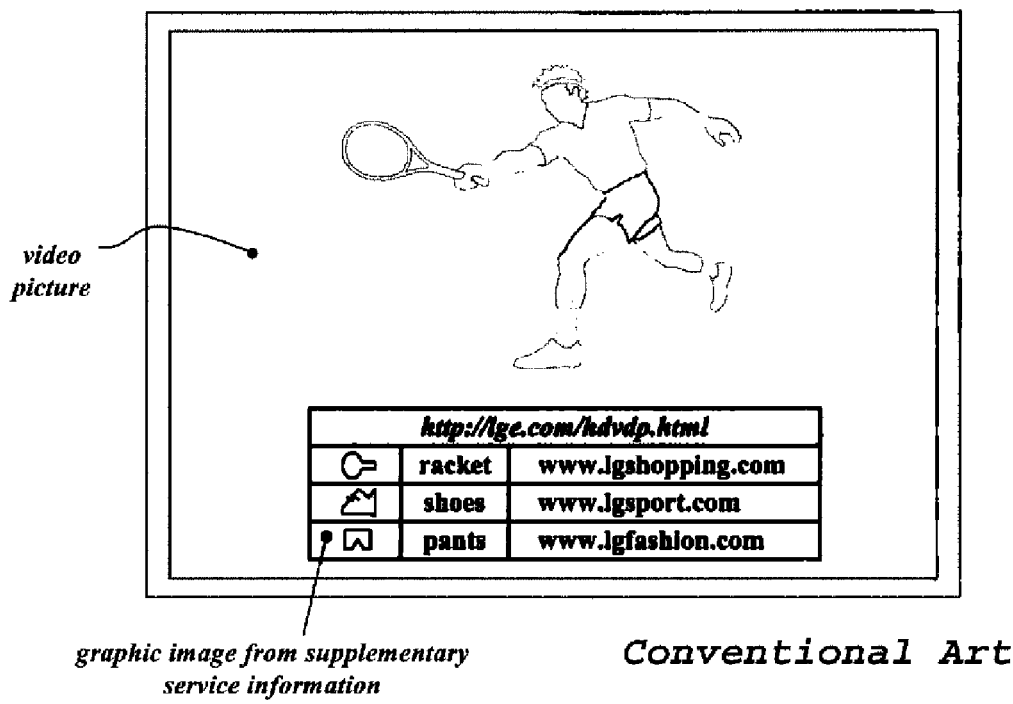
FIG. 2 is an example of video picture presented with a graphic image generated based on supplementary service information.

The digital television set 200 of FIG. 3 comprises, as described for FIG. 1, a VSB tuner 21 tuning VSB-modulated digital television broadcast signal received through an antenna, and extracting MPEG transport stream belonging to a channel chosen by a viewer from the tuned signal; an MPEG decoder 22 decoding A/V data stream contained in the extracted transport stream or received from the HD-DVD player 300 to original picture and sound data; and a PL separator 23 extracting PL data contained in the transport stream from the VSB tuner 21 or the HD-DVD player 300; and a storage unit 24 for storing the extracted PL data; a PL interpreter 25 interpreting PL data stored in the storage unit 24 or received from the PL separator 23, and conducting command indicated by PL data selected by a user; a graphic generator 26 generating a graphic image in accordance with the PL data interpretation; a mixer 27 mixing synchronously picture data from the MPEG decoder 22 with the generated graphic image from the graphic generator 26 to be presented together onto a screen; and an interfacing unit 28 communicating data with the HD-DVD player 300.

The HD-DVD player 300 reproduces real A/V data and PL data from the HD-DVD 31 and transmits them thorough an isochronous channel of the interfacing unit 35. Then, the digital television set 200 separates data received through the isochronous channel of the interfacing unit 28 into A/V data and PL data. Instead of transmitting A/V and PL data through same channel, the HD-DVD player 300 may transmit them via different channels, that is, real A/V data through the isochronous channel and PL data through an asynchronous channel.

FIG. 4 shows another block diagram of a HD-DVD player which further includes a PL separator 36. In the HD-DVD player configured as FIG. 4, the PL interpreter 34 receives PL data through the asynchronous channel of the interfacing unit 35, interprets PL data read from the HD-DVD 31 or received from the channel, and controls reproduction operation of the HD-DVD 31 in accordance with the interpretation of PL data. Therefore, PL data may be used as navigation data for reproduction control. In the meantime, the PL separator 36 separates data reproduced from the HD-DVD 31 into real A/V data and PL data which are transmitted through the isochronous and asynchronous channel respectively, of the interfacing unit 35.

A digital television set may be connected other optical disk devices such as a HD-DVD recorder 400 and a DVD player 500 besides the HD-DVD player 300 as shown in FIG. 5. Therefore, a digital television set should know which device PL data is related with among the connected HD-DVD player 300, the HD-DVD recorder 400, and the DVD player 500, so that an identifier is defined to use in PL data. For example, the string of 'hdvdp' is defined as the identifier for the HD-DVD player, so that PL data for the HD-DVD player 300 has a syntax of 'hdvdp://[space-id][resource-id]', the string of 'hdvdr' is defined for the HD-DVD recorder, so that PL data for the HD-DVD recorder 400 has a syntax of 'hdvdr://[space-id][resource-id]', and for the DVD player 500, its identifier is 'dvdp' and its PL syntax has the format of 'dvdp://[space-id][resource-id]'. According to the these rules, the digital television set 200 can distinguish which device and contents current PL data is requesting.

If a plurality of same devices are connected, for example, two HD-DVD player are connected, an additional identifier such as appended number digits is used to discriminate between same devices.

The part '[resource-id]' in the PL data syntax is used to designate unique contents contained in a corresponding device. Thus, the '[resource-id]' indicates directory, file, title, or chapter stored in a HD-DVD or DVD with its name or number. The PL data including the device identifier makes PL data applicable to bidirectional protocol. Therefore, PL data can be also delivered from the digital television set 200 to other connected device (300, 400, or 500). At this time, the PL data may be used a command requesting a certain operation of the connected device, and they are delivered through the asynchronous channel of IEEE 1394 interface standard.

The digital television set 200 obtains PL data through processing the received digital television broadcast signal, and displays contents of the obtained PL data on a menu screen. Among displayed PL data, one is chosen by a user, then the digital television set 200 sends the chosen PL data to a connected device the identifier contained in the PL data is indicative of in order to request an access of contents, written in a recording medium, the chosen PL data is pointing to. In addition, it is possible to access contents written in a recording medium of a connected device or data stored in the storage unit 24 of the digital television set 200 by using of PL data from another connected device.

Owing to this usage of PL data, menu can be constructed on a screen of a digital television set for itself or other devices without its own menu data by using PL data provided from other source device. On the contrary, a conventional DVD device should have its own menu data for displaying to a user.

Hereinafter described is a data recording structure of a recording medium to which a method of reproducing supplementary service information for A/V contents according to the present invention is applicable.

Figure 6:
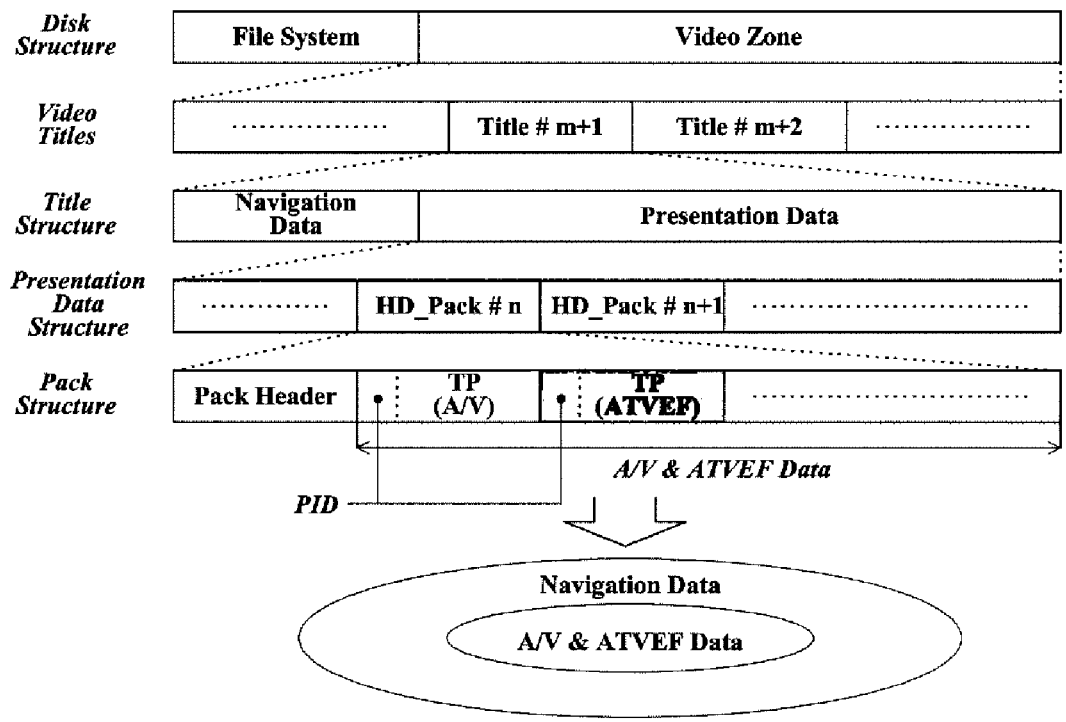
FIGS. 6 to 9 depict several hierarchical data structures of a high-density DVD according to each embodiment of the present invention.

FIG. 6 depicts hierarchical data structure of a HD-DVD according to an embodiment of the present invention.

The HD-DVD is partitioned into a file system area and a video zone. The video zone contains one or more titles, and each title consists of presentation data and their navigation data.

The presentation data consist a plurality of high-density Packs (called 'HDPK's hereinafter), whose size is fixed, for example 2048 bytes, and each HDPK is composed of pack header and pack data in which several Transport Packets (called 'TP's hereinafter) are included. In the area of each pack data, TPs containing real A/V data and TPs containing PL data in accordance ATVEF standard, that is, ATVEF data are interleaved as shown in FIG. 6. Each TP has Packet Identifier (called 'PID' hereinafter) to differentiate an A/V data TP from ATVEF data one.

A recording medium whose recorded data structure is configured as above is conceptually divided into two zones, one for navigation data, and the other for A/V data and ATVEF data whose TPs are interleaved within a HDPK.

When the HD-DVD player 200 configured as FIG. 4 reproduces the HD-DVD whose recorded data structure is as shown in FIG. 6, the PL separator 34 examines Program Service Information, written in the HD-DVD as management information, defining PIDs for all TP types, and confirms PIDs indicative of A/V data TP and ATVEF data one. Then, the PL separator 34 checks PID of every TPs included in presentation data reproduced from the HD-DVD 31 and separates A/V data TP and ATVEF data one based on their PIDs. The separated A/V data TPs and ATVEF data ones are transmitted to the digital television set 300 through the isochronous and asynchronous channel respectively, of the interfacing unit 35.

The digital television set 300 receives A/V data TPs through isochronous channel of the interfacing unit 28, and decodes the A/V data TPs to original video and sound data through the MPEG decoder 22. The ATVEF data TPs received through the asynchronous channel of the interfacing unit 28 are sent to the PL separator 23.

The ATVEF data TPs are interpreted and converted to a corresponding graphic image while being processed sequentially by the PL separator 23, the PL interpreter 25, and the graphic generator 26. The graphic image is synchronously mixed with a video picture from the MPEG decoder 22 at the mixer 27. The mixing time of the graphic image is determined based on PTS (Presentation Time Stamp) relation between corresponding ATVEF data TP and A/V data TPs.

Through the above-explained operations, PL data for supplementary service information can be provided for a digital television set along with A/V contents written in a recording medium like as digital television broadcast programs according to ATVEF or DASE standard.

The PL interpreter 34 of the HD-DVD player 200 may transmit all TPs included in reproduced presentation data through only isochronous channel of the interfacing unit 35 without checking PID of each TP. In this case of not separating, the interfacing unit 28 of the digital television set 300 further conducts the functions of checking and separating, that is, it checks PID of every TPs received through the isochronous channel, and separates A/V data TP and ATVEF data one based on their PIDs. A digital television set may equip with an additional element (not figured) to conduct the checking and separating instead of the function-integrated interfacing unit.

The separated A/V data and ATVEF data TPs are sent to the MPEG decoder 22 and the PL separator 23, respectively. The A/V data TPs are decoded to original video and sound data by the MPEG decoder 22, and the ATVEF data TPs are converted to a corresponding graphic image through sequential processes of the PL separator 23, the PL interpreter 25, and the graphic generator 26. Finally, the graphic image generated from one or more ATVEF data TPs is synchronously mixed with successive video pictures from the MPEG decoder 22 at the mixer 27, and then the mixed video pictures are presented onto a screen.

Hereinafter described is another data recording structure of a recording medium to which a method of reproducing supplementary service information for A/V contents according to the present invention is applicable.

Figure 7:
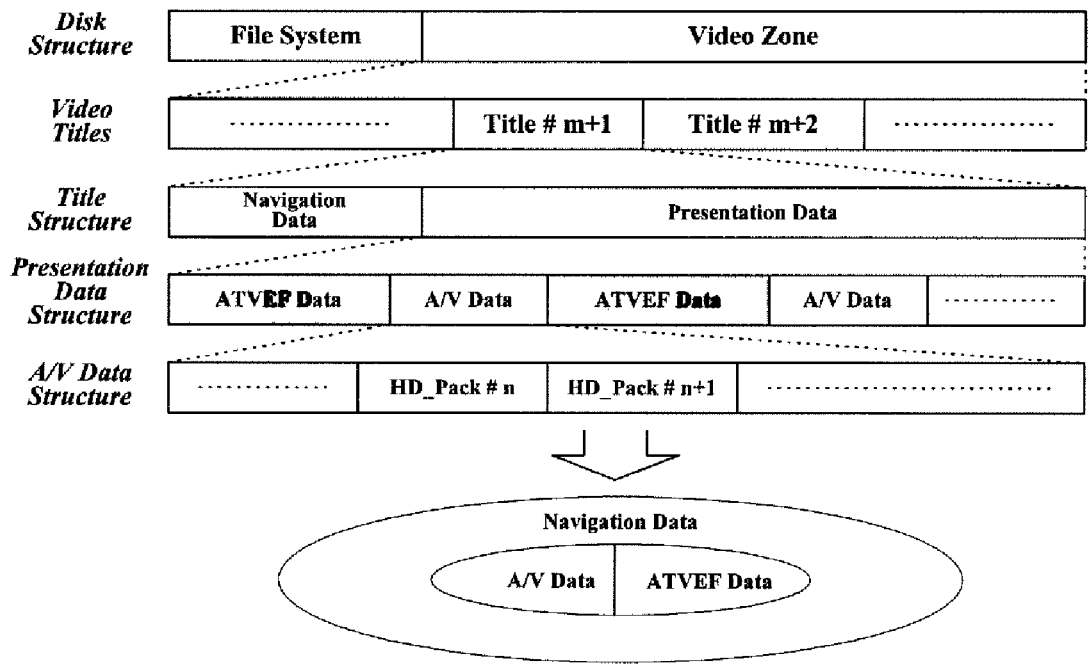

FIG. 7 depicts hierarchical data structure of a HD-DVD according to another embodiment of the present invention.

The HD-DVD of FIG. 7 is partitioned into a file system area and a video zone which contains one or more titles and each title consists of presentation data and their navigation data the same as FIG. 6. However, this structure is different from that of FIG. 6 in that ATVEF data TPs and A/V data TPs are written in different HDPKs.

A recording medium whose recorded data structure is configured as above is conceptually divided into two zones, one for navigation data and the other for A/V data and ATVEF data which are written in different HDPKs.

Figure 8:
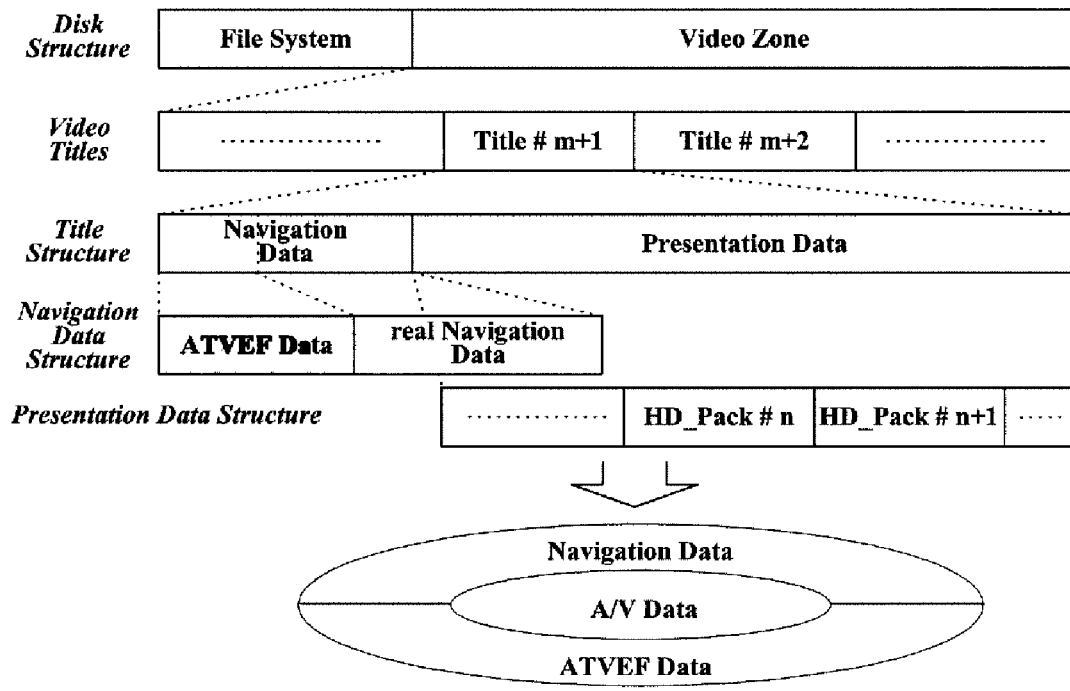

FIG. 8 depicts hierarchical data structure of a HD-DVD according to another embodiment of the present invention. In this data structure, ATVEF data are written with complete separation from all recorded A/V data like navigation data.

A recording medium whose recorded data structure is configured as FIG. 8 is conceptually divided into two zones, one for navigation data and ATVEF data which are separated each other, and the other for pure A/V data.

Figure 9:
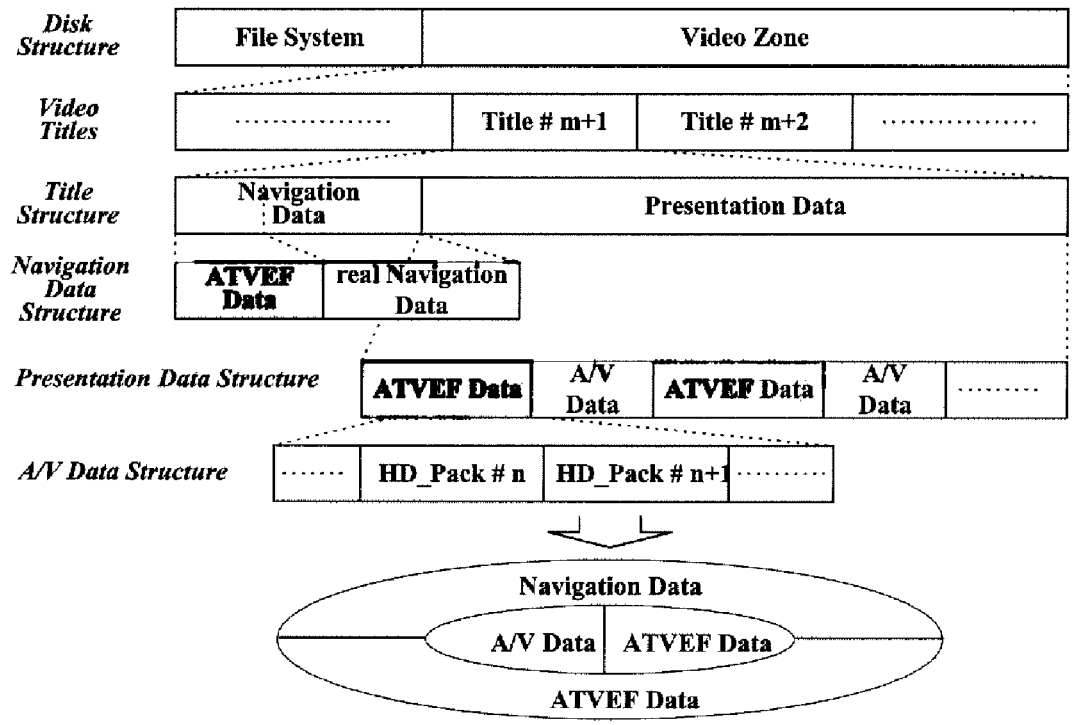

FIG. 9 depicts hierarchical data structure of a HD-DVD according to another embodiment of the present invention. In this data structure, ATVEF data are written in both of area for navigation data and area for A/V data. The partial ATVEF data in the A/V data area are written in different HDPKs with A/V data like as the embodiment of FIG. 7.

A recording medium whose recorded data structure is configured as FIG. 9 is conceptually divided into two zones, one for navigation data and partial ATVEF data which are separated each other, and the other for A/V data and partial ATVEF data which are written in different HDPKs.

The ATVEF data, written in navigation data area as shown FIGS. 8 and 9, can be used as navigation data for control of searching and reading real A/V data contained in the HD-DVD 31. For example, in the HD-DVD player 300 in which the PL separator 36 and the PL interpreter 34 are equipped separately, the PL interpreter 34 can interpret PL data reproduced from the navigation data area of the HD-DVD 31 and conduct an operation in accordance with search or control information indicated by the interpreted PL data.

For the data structure of FIG. 8, ATVEF data can not be reproduced at the same time as A/V data are reproduced along tracks, so that they are suitable for menu data if menu is composed of commands requesting selection and reproduction of contents recorded in a recording medium to a corresponding device.

The method and apparatus of providing supplementary service information of A/V contents through a recording medium according to the present invention, can supply a digital television set with Presentation Language data of supplementary service information, like as in a digital broadcast signal satisfying ATVEF or DASE standard, for A/V contents recorded in a recording medium as well as A/V contents, therefore, various video information and functions provided with PL data by a recording medium can be realized at a digital television set being able to accept PL data.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of processing content data and language formatted data associated with the content data, the method performed by a reproducing and comprising:

receiving a transport stream;

retrieving a data stream, management information, and linking information from the transport stream, wherein the data stream includes the content data and the language formatted data, the content data consisting of at least one content segmented unit and the language formatted data consisting of at least one language formatted segmented unit, wherein the content segmented unit and the language formatted segmented unit have identifier (ID) and presentation time information, respectively, and wherein the language formatted data is configured for being reproduced together with the content data;

separating the data stream into the content segmented unit and the language formatted segmented unit using the management information, wherein the management information indicates whether segmented unit is the content segmented unit of the language formatted segmented unit using the ID of the segmented unit;

associating the separated content segmented unit and the separated language formatted segmented unit with each other using the linking information, wherein the linking information assigns reference information to the content data for associating the content data with the language formatted data;

decoding the associated content segmented unit at a specific time determined by the presentation time information included in the content segmented unit;

decoding the associated language formatted segmented unit in a synchronous manner with the content segmented unit using the presentation time information included in the language formatted segmented unit; and outputting the decoded content segmented unit and the decoded language formatted segmented unit.

2. The method of claim 1, wherein the segmented unit is a packet and the identifier is a packet identifier (PID).

3. The method of claim 1, wherein the management information matches the identifier of the segmented unit to a data type assigned to the segmented unit.

4. The method of claim 1, wherein the reproducing device includes a first decoder being used for decoding the content data and a second decoder being used for decoding the language formatted data.

5. The method of claim 1, wherein the management information is configured for being included in the data stream.

6. An apparatus of processing content data and language formatted data associated with the content data, the apparatus comprising:

a receiving unit configured to receive a transport stream;

a decoder configured to decode the content data and the language formatted data;

an outputting unit configured to output the decoded data; and a controller configured to:

retrieve a data stream, management information, and linking information from the transport stream, wherein the data stream includes the content data and the language formatted data, the content data consisting of at least one content segmented unit and the language formatted data consisting of at least one language formatted segmented unit, wherein the content segmented unit and the language formatted segmented unit have identifier (ID) and presentation time information, respectively, and wherein the language formatted data is configured for being reproduced together with the content data, separate the data stream into the content segmented unit and the language formatted segmented unit using the management information, wherein the management information indicates whether segmented unit is the content segmented unit of the language formatted segmented unit using the ID of the segmented unit, associate the separated content segmented unit and the separated language formatted segmented unit with each other using the linking information, wherein the linking information assigns reference information to the content data for associating the content data with the language formatted data, control the decoder to decode the associated content segmented unit at a specific time determined by the presentation time information included in the content segmented unit, and to decode the associated language formatted segmented unit in a synchronous manner with the content segmented unit using the presentation time information included in the language formatted segmented unit, and control the outputting unit to output the decoded content segmented unit and the decoded language formatted segmented unit.

7. The apparatus of claim 6, wherein the segmented unit is a packet and the identifier is a packet identifier (PID).

8. The apparatus of claim 6, wherein the management information matches the identifier of the segmented unit to a data type assigned to the segmented unit.

9. The apparatus of claim 6, wherein the decoder includes a first decoder being used for decoding the content data and a second decoder being used for decoding the language formatted data.

10. The apparatus of claim 6, wherein the management information is configured for being included in the data stream.

* * * * *